Feb. 2, 1932. G. A. UNGAR 1,843,655
CUTTING SHEAR
Filed May 20, 1927 3 Sheets-Sheet 1
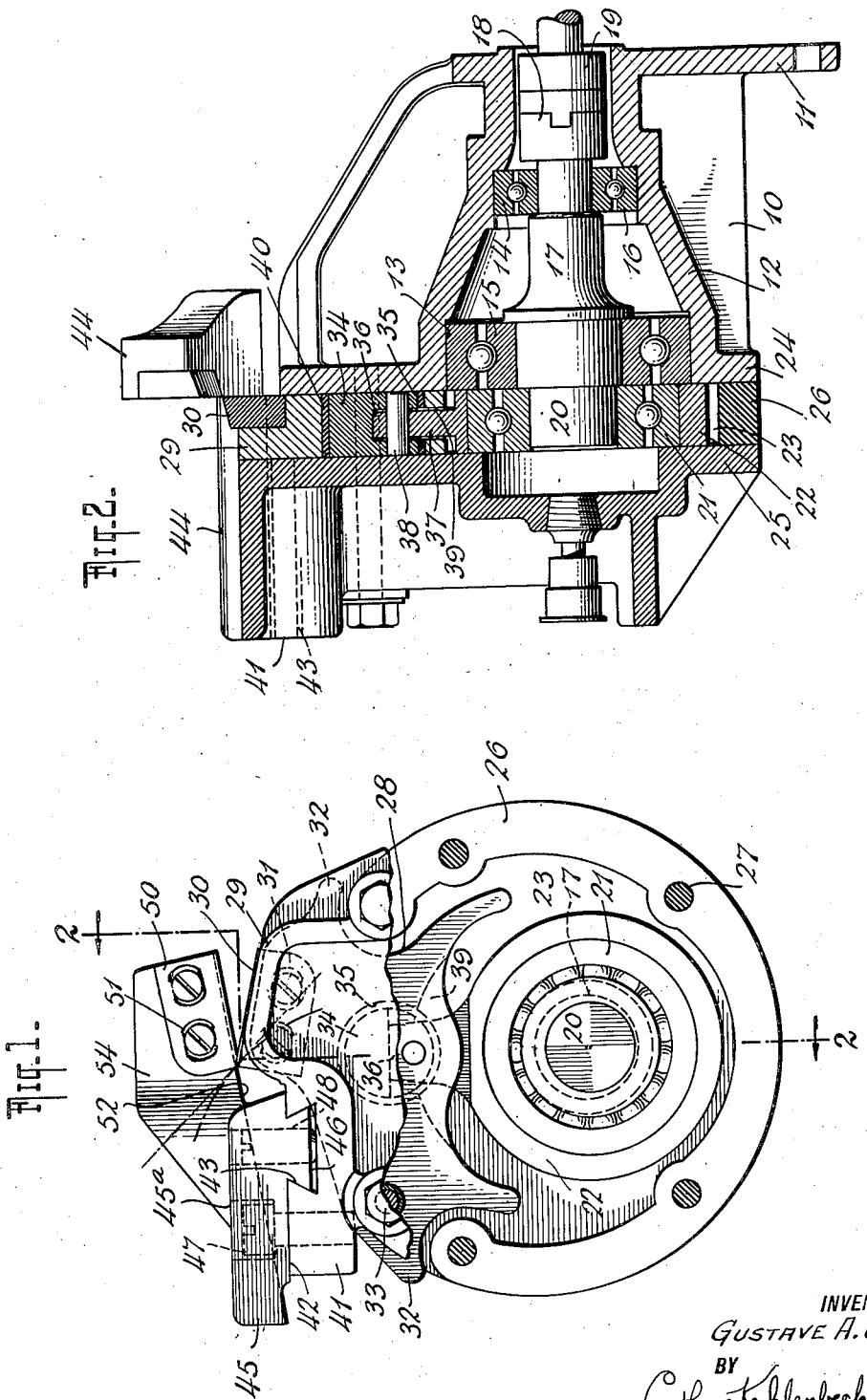
INVENTOR
GUSTAVE A. UNGAR
BY
Lotka, Kehlenbeck & Farley
ATTORNEYS Feb. 2, 1932.    G. A. UNGAR    1,843,655
CUTTING SHEAR
Filed May 20, 1927    3 Sheets-Sheet 2
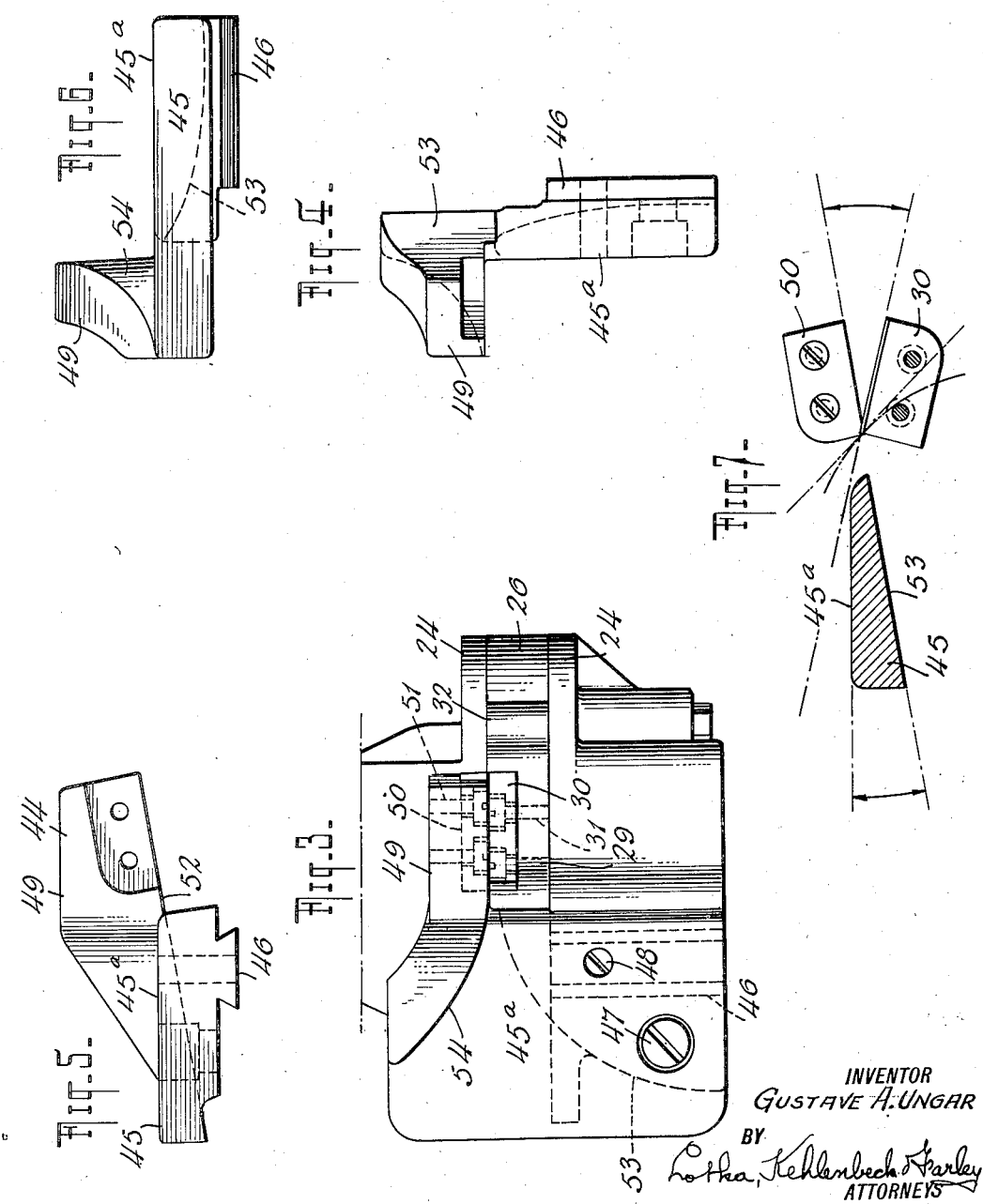
INVENTOR
GUSTAVE A. UNGAR
BY
Lotka, Kehlenbeck & Harley
ATTORNEYS Feb. 2, 1932.  G. A. UNGAR  1,843,655
CUTTING SHEAR
Filed May 20, 1927   3 Sheets-Sheet 3
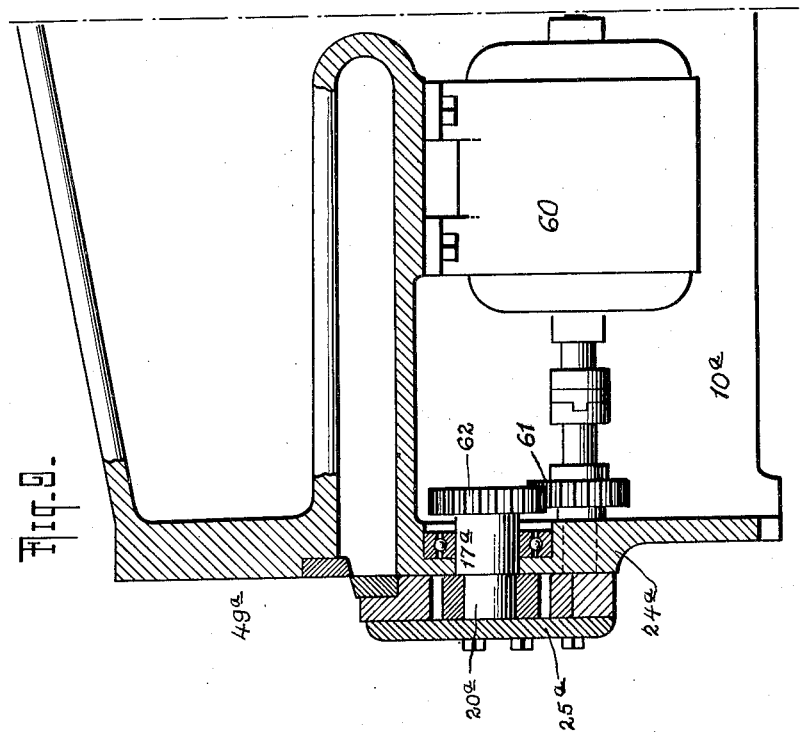
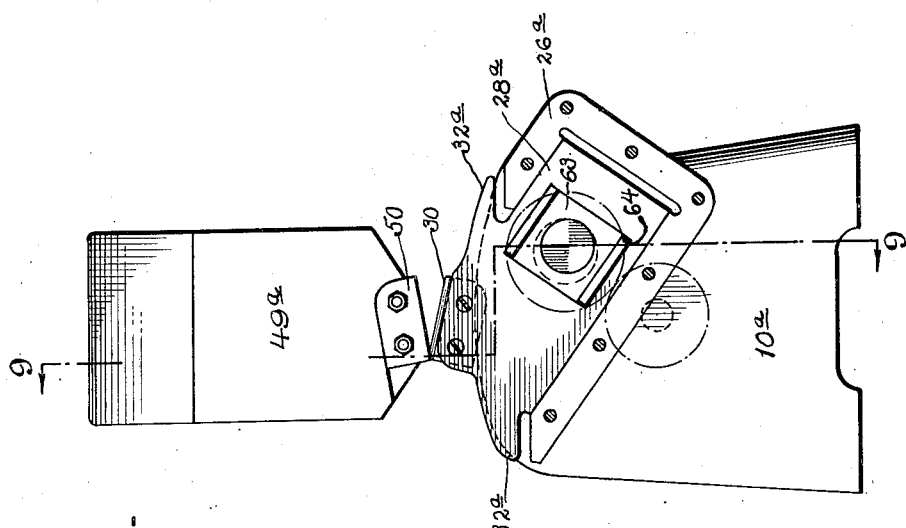
INVENTOR
GUSTAVE A. UNGAR
BY
Lotka, Kehlenbeck & Harley
ATTORNEYS Patented Feb. 2, 1932

1,843,655

UNITED STATES PATENT OFFICE

GUSTAVE A. UNGAR, OF PELHAM MANOR, NEW YORK

CUTTING SHEAR

Application filed May 20, 1927. Serial No. 192,811.

This invention relates to cutting shears of the type employed for the cutting of sheet materials such as metal, leather, cardboard or the like, and particularly to such type of shears in which the cutting action is performed by a rapidly reciprocating cutting blade having a stroke of small amplitude.

The invention relates more particularly to shears of the type in which a pair of relatively short cutting blades are arranged with their cutting edges at an angle to provide an open throat into which the sheet material is fed, one of said blades being held stationary and the other being rapidly reciprocated to and from the stationary blade with a stroke of small amplitude.

The principal object of the present invention is to improve upon the construction of the shears of the type described by providing a new mechanism for actuating the movable blade.

Another object is to simplify the construction of the blade actuating mechanism, not only for the purpose of decreasing the construction cost thereof, but also to provide a more durable and sturdy construction and thereby lessen the maintenance cost.

A further object is to provide a new and improved motion for the movable blade by means of which the efficiency of the shears is greatly increased and a cleaner cut is secured.

Another object is to improve upon the construction of the shear head and simplify the manufacturing operations connected therewith, while at the same time securing a construction of such head that will be more sturdy and durable.

A further object is to improve upon the construction of shears so that the dropping of particles of material cut by the shears into the housing or guideway for the movable blade carrier will be absolutely prevented.

Other objects, such as improving upon the constructional details of the housing and other parts of the shears so as to simplify the manufacturing operations connected therewith, will appear more fully from the following more detailed description and by reference to the accompanying drawings forming a part hereof, wherein Fig. 1 is a front elevation of a shears constructed in accordance with the principles of my invention; a portion of the cover plate being broken away; Fig. 2 is a section on the line 2—2 of Fig. 1; Fig. 3 is a plan view of the structure shown in Fig. 1; Fig. 4 is a side view of the upper blade carrier as seen from the right hand side of Fig. 3; Fig. 5 is a front elevation of said carrier; Fig. 6 is a side view of such carrier as seen from the left hand side of Fig. 3; Fig. 7 is a diagrammatic view showing the relative positions of the cutting blades and the supporting and guiding surfaces for the work; Fig. 8 is a front elevation of a modified form of construction for the movable blade carrier, and Fig. 9 is a section on the line 9—9 of Fig. 8.

As shown in the drawings, I provide a bracket or housing 10 having a back plate 11 formed integral therewith and by means of which the bracket may be secured to any suitable support. The bracket 10 is bored to provide seats or pockets 13—14 in which ball or other suitable bearings 15, 16 are adapted to be received. Mounted within the bearings 15, 16 is an eccentric, or crank, shaft 17, one end of which projects through the ball bearing 14 and is preferably provided with a non-circular socket 18, to which a coupling 19 is adapted to be secured for connecting the shaft 17 to a motor, (not shown), or other suitable source of power.

The other end of the shaft 17 projects outwardly beyond the bearing 15 and is formed to provide a throw 20 which, as clearly shown in Figs. 1 and 2 of the drawing, is eccentric to the axis of rotation of the shaft 17. The eccentric throw 20 fits within a ball, or other suitable bearing 21 seated within the bore of a connecting or driving rod 22. The latter fits slidably within a guideway 23 provided between the front wall 24 of the bracket 10 and a front, or cover, plate 25; the plate 25 being held in properly spaced relationship to the front wall 24 by means of a spacer 26. The front plate 25 and the spacer 26 are secured to the housing 12 by means of a plurality of bolts 27 which extend through the front plate and spacer and are screwed into the bracket 10. The spacer 26, as clearly shown in Fig. 1, extends about the periphery of the front plate 24 of the bracket 10 and closes the bottom and sides of the guideway space 23, the ends of the spacer terminating at the top of said space, to leave an open top through which the upper end of the lower blade carrier 28 projects.

The blade carrier 28 fits slidably between the front wall 24 of the bracket 10 and the rear wall of the cover plate 25, and said blade carrier is provided with an upward extension 29, suitably mortised out to receive the cutting blade 30, which is secured to the blade carrier by means of the bolts or screws 31. At each side thereof, the blade carrier 28 is provided with projecting lugs 32, which extend outwardly beyond the spacer 26 for preventing foreign matter from dropping into the space 23. The blade carrier 28 is pivotally supported adjacent to one side thereof, and considerably below the blade 30, upon a fixed pivot bolt 33 which passes through the front plate 25 and the blade carrier and is screwed into the bracket 10.

Reciprocating or oscillating motion of the blade carrier 28 about its pivotal mounting 33 is effected through the connecting rod 22. The blade carrier 28 is connected to the connecting rod 22 by means of a rocker pin 34, rotatably mounted within a bore 35 provided in the blade carrier 28 below the blade 30. This rocker pin is slotted to provide a pair of yoke jaws 36, between which an upwardly projecting ear 37, provided on the connecting link 22, is adapted to be received. The upper end of the ear 37 terminates in a flat face which seats against the inner wall of the slot provided in the rocking pin 34, and said ear is held in proper position within said rocking pin by means of a connecting pin 38. In order to provide clearance for the movement between the connecting link 22 and the blade carrier 28, and to permit the passage of the ear 37 through the blade carrier 28, the latter is provided with a slot 39 on its bottom side. A bushing 40 is preferably interposed between the rocking pin 34 and the blade carrier.

At its upper rear portion, the front plate 25 is provided with a laterally extending enlargement 41, the upper face of which is machined to provide a flat supporting surface 42 and a dove-tailed guideway 43, the latter extending perpendicularly to the vertical plane in which lies the path of movement of the movable blade carrier. The upper blade carrier 44, shown most clearly in Figs. 3 to 7 inclusive of the drawing, has a lateral extension 45, the lower flat face of which is adapted to seat upon the flat face 42 of the front plate, and said extension is provided with a dove-tailed projecting rib 46 which seats within the dove-tailed guideway 43. The upper face 45ª of said extension forms with the top of the cover plate 25, a supporting table or shelf for the work. For securing the upper blade carrier upon the enlargement 41, I may provide any suitable means, such as the fillister head screw 47, and the set screw 48, the former passing through the blade carrier 44 and screwing into the enlargement 41, and the set screw screwing into the blade carrier 44 and seating against the bottom of the dove-tailed guideway 43, thus serving to lock or jam the dove-tailed rib 46 within said guideway.

The upper blade carrier 44 is of peculiar configuration and consists of the lateral extension 45 above referred to, and an upwardly projecting rib 49 which forms and anvil in which the upper stationary cutting blade 50 is secured. The anvil 49 is mortised out at its lower front end to receive the cutting blade 50, screws 51 being provided to hold the blade 50 within its mortise. The lower face 52 of the anvil 49 extends at an angle to the horizontal as clearly shown in Fig. 1, and in parallelism with the cutting edge of the blade 50. This inclined lower face of the anvil 49 is bounded, on that side of the anvil in which the cutting blade 50 is seated, and rearwardly of said cutting blade, by the curved, vertically extending, wall 53, of the lateral extension 45, which wall bounds or defines the inner end of said lateral extension 45, thus providing a clearance space, below and extending rearwardly of the upper blade, through which the material, cut from a sheet, may pass, the lower face 52 serving to guide or direct such cut material as it leaves the cutting blades. The vertically extending side face 54 of the anvil 49, on the side of the anvil in which the blade 50 is seated, is also curved but in a direction opposite to the curvature of the wall 53. It will be noted that the curved walls 53, 54, as shown in Fig. 3, are substantially tangent to the vertical plane in which the cutting edges of the blades are located, while the lower face 52 of the anvil and the upper face 45ª of the lateral extension 45 extend substantially parallel to the cutting edge of the upper blade and to the bisector of the angle between the blades respectively.

By constructing the upper blade carried of two separate pieces instead of as a single casting, not only are the manufacturing costs of the shear head decreased, but if breakage of the upper blade carrier or anvil should occur, the member 44 can be removed and replaced without disturbing the lower assembly or any of the moving parts of the device. In addition, the separate upper carrier 44 may be moved longitudinally of the dove-tailed guideway 43 to adjust accurately the relative lateral position of the upper blade 50 to the lower blade 30, there being sufficient clearance between the screw 47 and the hole in the carrier 44 through which said screw passes to permit a movement of the carrier of surcient extent for such adjustment.

In prior constructions it was heretofore considered necessary, in order to prevent distortion of the work, to have the supporting and guiding surfaces for the work extending at the same angle as the cutting edges of the blades and therefore in parallelism with the said cutting edges. I have found, however, that the best results are obtained when the angle between the surfaces 45ª, 52 is less than the angle between the blades, and preferably with the surface 45ª substantially horizontal or parallel to the bisector of the angle included between the cutting edges.

The manner in which the blade moving mechanism shown in Figs. 1 and 2 operates is as follows:

Assuming that the main shaft 17 is rotated rapidly by any suitable means, such as an electric motor, the engagement of the eccentric throw 20 of said shaft with the connecting link 22, through the ball bearing 21, will result in said rotation imparting to the lower end of the connecting link a movement in substantially a circular path, the amplitude of which is governed by the extent of eccentricity of the throw 20. As the upwardly projecting ear 37 of the connecting link 22 is pivotally connected to the blade carrier 28 by means of the connecting pin 38 and the rocking pin 34, and as the blade carrier 28 is constrained to oscillate about the axis of the fixed pivot 33, the horizontal component of the circular movement of the lower part of the connecting link will merely result in causing a rocking of the rocking pin 34 within its bearing in the blade carrier 28. The vertical component of the circular path of motion of the connecting link 22 will result in producing an oscillation of the blade carrier 28 upon its fixed pivot 33, thus causing the lower blade 30 to be moved to and from the upper blade 50 in a slightly curved path, the radius of which has its center at the axis of the fixed pin 33. The amplitude of the stroke of the lower blade 30 obviously is determined by the extent of the eccentricity of the eccentric throw 20 and, as this eccentricity is quite small, it will be seen that the amplitude of the stroke of the cutting blade is very small; in practice the stroke is from 1/16 to 1/8 of an inch in amplitude. It will thus be seen that, with a stroke of such small amplitude, the cutting action of the blades is performed by only a very small portion thereof at the inner ends of said blades. The axis of the pivot 33 is so located that the path of movement of the cutting edge of the lower blade will be substantially a straight line movement extending approximately at an angle of 45° to the horizontal plane in which the cutting edge of the upper blade 50 lies. It will thus be seen that the lower blade will move in a path such that it will have two equal components of movement, one component extending normally to the cutting edge of the upper blade, and the other extending parallel to said cutting edge, and, as a result, the lower blade will exert a pressure upon the material being cut in a direction tending to pull the work inwardly between the cutting blades as well as in the direction to exert a shearing cut. As the blade holder is moved upwardly to exert a shearing cut, the thrust of the upward movement of the connecting link is taken up by the flat upper face of the projecting ear 37 and the flat lower face of the slot in the rocking pin 34, the forces thus being exerted through solidly constructed members having relatively large contacting or bearing surfaces. As the downward movement of the cutter holder 28 is not resisted by any forces other than the frictional resistance of the moving parts, the connecting pin 38 can be made relatively small in diameter, as shown.

It will be noted that the opening at the upper end of the space 23 located between the ends of the spacer 26 is closed by the movable blade holder 28 and that the projecting ears 32 of said blade holder extend well over and about the upper ends of the spacer so that any particles of metal or other material will be deflected by the blade holder and its projecting ears 32 and will thereby be prevented from dropping in the space in which the movable blade holder and the connecting link 22 are located.

In Figs. 8 and 9 I have shown a further constructional example of a blade moving mechanism embodying the principles of the invention. As shown in said figures, the lower blade holder 28ª, instead of being pivotally mounted on a fixed pivot, is mounted for reciprocation in a straight line. The spacer 26ª which is interposed between the front plate 24ª of the frame 10ª, and the cover plate 25ª, is of U shape, and the blade holder 28ª fits slidably between the inner faces of the legs of the U in a manner which will be readily understood.

The frame 10ª has formed integrally therewith an upper head or standard 49ª which carries the upper blade 50, an open U shaped slot being provided between the standard and the base of the frame to permit the free passage of the work through the shears.

Suitably secured to the frame 10 is a motor 60 having a gear 61 fixed to its armature shaft. Gear 61 meshes with a gear 62 on one end of a crank shaft 17ª which is provided at its other end with an eccentric, or crank throw 20ª. The crank throw 20ª engages within a bearing block 63 slidably mounted in a guideway 64 provided in the blade carrier 28ª; a bushing preferably being interposed between the throw and bearing block.

The blade carrier 28ª projects upwardly beyond the top of the spacer 26ª and has secured thereto the lower blade 30. Laterally projecting ears 32ª are provided on the blade carrier and extend over the top side edges of the spacer to serve as guards or deflectors similar to the ears 32 shown in Figs. 1 and 2.

As clearly shown in Fig. 8 the U shaped opening of the spacer 26ª extends at an approximate angle of 45° to the cutting edge of the upper blade 50, whereby the same shearing principles are carried out in the movement of the movable blade relatively to the fixed blade as hereinbefore described in connection with the construction shown in Figs. 1 and 2.

As the operation of the structure shown in Figs. 8 and 9 will be readily understood from an inspection of the drawings, a detailed description thereof is not thought to be necessary.

In each constructional example of blade moving mechanism shown, it will be seen that the lower blade 30 is reciprocated with substantially a straight line movement in a path preferably extending approximately at an angle of 45° to the cutting edge of the upper blade. Although the angle of 45° shown secures the best results and gives the maximum feed of the work to the blades, it is to be understood that the principles of the invention are not limited to the movement of the movable blade at a 45° angle. Obviously any angle of the path of movement of the movable blade less than 90° and in a direction such that the path will have a component which will tend to pull the work into the blades may be employed. It may be desirable with certain types of work where a slower feed is desired, to employ a path of movement for the movable blade, the angle of which to the cutting edge of the other blade is greater than 45° and less than 90°. This angular movement of the movable blade with a rapid, substantially straight line, reciprocation of small amplitude is decidedly distinct from and presents marked advantages over a movement of the blade in an elliptical path, because in the latter case, the initial portion of the blade movement in performing a shearing cut is in a direction substantially normal to the cutting edge of the stationary blade, thereby tending to push the work outwardly of the open throat between the blades, whereas when the blade movement is as herein disclosed, the movable blade exerts a feeding action of equal effect throughout its entire stroke, and as a result, not only does the shear have greater capacity, but a much cleaner cut is secured and distortion of the work is reduced to a minimum.

Adjustment of the blades 30 and 50 in a vertical direction is provided for by making the holes in the blades, through which the screws 31 and 51 respectively pass, slightly elongated, thereby permitting the blades to be moved longitudinally of their respective mortises, the angle of inclination of the blades to the horizontal obviously causing longitudinal movement of the blades within their mortises to bring the inner effective portion of their cutting edges into the desired proper overlapping relationship. In order to produce the best results the inner edges of the blades should be so set that when the lower blade is at its downward limit of motion, the extreme inner points of the blades should lie substantially in the same horizontal line or plane, or preferably slightly apart.

It will be noted by referring to Fig. 1, that the longitudinal centre line of the connecting link 22 (in the form of the invention shown in Figs. 1 to 3 inclusive) at dead centre passes through approximately the centre of the effective portion of the cutting edges of the blades. As a result the pressure exerted by said link in performing a shearing cut is transmitted as a compression stress longitudinally of the entire length of the link, and therefore no shearing or twisting strains are set up that would tend to distort the link or to throw unequal wearing pressures upon the bearings of the rotating members.

In the construction shown in Figs. 1 and 2, the bracket 10 and the parts carried thereby are so constructed that all of the parts which constitute the shear head may be readily assembled and he assembled shear head can then be clamped to any suitable support, upon which an electric motor, a belt, pulley or the like may be mounted.

While I have shown the upper blade 50 stationary and the lower blade 30 movable, it will be obvious that either the upper or lower blade may be made the movable one and that in some instances it may be desirable to make both blades movable. It will further be understood that many other changes, variations and modifications may be resorted to without departing from the spirit of my invention.

I claim:

1. In a shears, a bracket defining a housing and having a front wall, a front plate secured to said bracket and defining with the front wall thereof a guideway having a pair of spaced parallel guiding surfaces, a spacer secured between said front plate and said front wall, a movable blade holder mounted in said guideway in sliding engagement with said surfaces, a crank shaft in said housing having its throw located in said guideway, and a connecting link pivotally connected with said blade holder and crank shaft and being slidably mounted within said guideway.

2. In a shears, upper and lower cutting blades, a guideway located below said blades, and a blade holder to which said lower blade is secured, movably mounted in said guideway, said blade holder being provided with means projecting above the sides of said guideway for preventing the dropping of foreign material into said guideway.

3. A shear head comprising a bracket, provided with means enabling it to be secured to a support, a crank shaft mounted in said bracket, a member defining with said bracket a guideway, and a movable blade holder mounted in said guideway, said member having detachably secured thereto an anvil block, the latter being provided with a portion which extends over said bracket and having means for securing thereto a cutting blade.

4. In a shears, a shear head of the type wherein a pair of cutting blades are mounted in co-operating relationship with their cutting edges extending at an oblique angle to each other and forming an open throat into which the material is fed, said shear head being provided with upper and lower surfaces extending rearwardly of the intersection of said cutting blades, and said surfaces being bounded by curved vertical surfaces which are approximately tangent to each other at the point of intersection of the cutting blades, characterized by the provision of a lower member and an upper member detachably secured thereto, said upper member being provided with said upper and lower surfaces and the curved bounding surface for said upper surface.

5. In a shears, a shear head comprising a bracket, a movable blade and driving means therefor carried by said bracket and an anvil detachably secured to said bracket, a stationary blade carried by said anvil having a cutting edge which extends at an oblique angle in juxtaposition to the cutting edge of said movable blade, said anvil and bracket respectively being provided with lower and upper work supporting surfaces extending rearwardly from the meeting points of said blades and having clearance spaces to permit the free passage of the work below and above said surfaces.

6. A shears as set forth in claim 5, in which the clearance spaces extend transversely in opposite directions of the vertical plane in which the meeting points of the cutting blades lie to permit rotation of the work about a vertical axis.

7. In a shears, a shear head comprising a bracket, and an anvil detachably secured thereto, a movable cutting blade carried by said bracket, and a stationary cutting blade carried by said anvil, said anvil being provided with an upper work supporting and a lower work guiding surface extending rearwardly of, and one on each side of, said cutting blades.

8. In a shears, a shear head comprising a bracket, and an anvil detachably secured thereto, a movable cutting blade carried by said bracket, and a stationary cutting blade carried by said anvil, said anvil being provided with an upper work supporting and a lower work guiding surface extending rearwardly of, and one on each side of, said cutting blades, and said bracket and anvil being constructed and arranged to provide free clearance spaces rearwardly of said cutting blades and adjacent to said surfaces to permit the free passage of the work through said shears.

9. A shears for cutting sheet material of the type wherein there is provided a pair of cutting blades mounted in parallel juxtaposed relationship with their cutting edges forming an acute angle, one of said blades being mounted for movement relatively to the other, driving mechanism connected with said movable blade for imparting thereto a rapid reciprocation of small amplitude toward and from said stationary blade to cause only a small portion of the cutting edges of said blades adjacent to the apex of the angle formed thereby to pass each other, having a shear head upon which said blades are mounted, said shear head consisting of a pair of spaced lower members defining a guideway for the movable blade, and one of said members having detachably connected thereto an anvil block having a portion projecting over the movable blade and a lateral extension, said lateral extension serving to connect said anvil block to said one of said lower members.

10. A shears as set forth in claim 9, in which the lateral extension of the anvil block is wedge-shaped and is provided with surfaces to support and guide the cut portions of the work sheet, which surfaces diverge rearwardly from the apex of the angle of the cutting blades.

11. A shears as set forth in claim 9, in which the lateral extension of the anvil block is wedge-shaped and is provided with surfaces to support and guide the cut portions of the work sheet, which surfaces diverge rearwardly from the apex of the angle of the cutting blades, the material of said anvil block being constructed and arranged adjacent to said surfaces to provide sufficient clearance to permit relative movement between the work sheet and the cutting blades about an axis perpendicular to said sheet.

12. A shears for cutting sheet material of the type wherein a pair of cutting blades are mounted in parallel juxtaposed relationship with their cutting edges forming an acute angle, one of said blades being mounted for movement relatively to the other, and driving mechanism is connected with said movable blade for imparting thereto a rapid reciprocation in a stroke of small amplitude to cause only a small portion of the cutting edges of said blades adjacent to the apex of the angle formed thereby to pass each other, having a lower member having a guideway in which is slidably mounted a blade holder for the movable blade, said lower member being provided, adjacent to and rearwardly of said apex, with a lateral extension and an anvil block detachably secured to the upper face of said extension, said anvil block having a wedge-shaped portion by means of which said anvil block is secured to said lower member, said wedge-shaped portion being located rearwardly of the cutting edges of said blades and having a pair of surfaces which diverge rearwardly from the apex of said angle, and said anvil block being further provided with an upwardly projecting rib extending forwardly and terminating adjacent to the movement cutting blade and having means for the securing to said anvil of a stationary cutting blade.

13. In a shears, a supporting framework, having a plane outer surface, a plate secured to said framework and having its inner face in spaced parallelism with said surface to define therewith a pair of spaced guideways, a shaft rotatably mounted in said framework having an eccentric throw located between said guideways, an antifriction bearing encircling said eccentric, a movable blade holder slidably mounted between said guideways and an eccentric strap also mounted between said guideways and operatively connected with said blade holder, said antifriction bearing, said blade holder and said eccentric strap all being of the same width and engaging slidably with said guideways, the latter thus serving to hold said members against lateral movement.

14. In a shears, a unitary assembly comprising a bracket provided with bearing recesses, bearings mounted in said recesses, a movable blade holder, a cutting blade carried by said holder, a crank shaft, mounted in said bearings, having at one end thereof means for connecting it with a motor, means for connecting said crank throw with said movable blade holder, a stationary blade fixedly associated with said bracket for cooperation with the movable blade, and said bracket being provided with means for enabling said assembly to be interchangeably associated with different supporting frames.

15. In a shears, a pair of cutting blades having their cutting edges inclined to each other, one of said blades being pivotally mounted, a crank shaft and means for connecting the throw of said crank shaft with said pivotally mounted blade including a rocking bearing operatively associated with said blade, a link connected at one end with said rocking bearing and at its other end with the throw of said crank shaft, the longitudinal axis of said link at dead center passing through approximately the center of the effective portion of the cutting edges of said blades.

16. In a shears, a pair of cutting blades having their cutting edges inclined to each other, a movable blade holder upon which one of said blades is secured, a fixed pivot upon which said blade holder is pivotally mounted, said pivot being located to one side of and rearwardly of the intersection of the blades, a crank shaft, and a member connecting the throw of said crank shaft and the movable blade holder, the longitudinal centre line of said member at dead centre intersecting the axis of said shaft and the centre of the connection between said member and holder whereby the pressure necessary to perform the shearing cut is transmitted as a compression stress longitudinally of the entire length of said member directly to the blade holder rearwardly of the movable blade and in a direction towards the cooperating blade.

In testimony whereof I have hereunto set my hand.

GUSTAVE A. UNGAR.

DISCLAIMER 1,843,655.—*Gustave A. Ungar*, Pelham Manor, N. Y. CUTTING SHEAR. Patent dated February 2, 1932. Disclaimer filed February 2, 1940, by the assignee, *The Stanley Works*.

Hereby enters this disclaimer as to claims 7 and 8 of said patent without disclaiming the inventions thereof.

[*Official Gazette February 27, 1940.*]